(12) United States Patent
Sigg et al.

(10) Patent No.: US 8,306,577 B1
(45) Date of Patent: Nov. 6, 2012

(54) SYSTEM AND METHOD FOR ADJUSTING THE VOLUME OF AN EARPIECE USING REVERSE FRAME DATA RATE

(75) Inventors: Jason P. Sigg, Overland Park, KS (US); Ashish Bhan, Shawnee, KS (US); Anthony Leung, Kansas City, MI (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 366 days.

(21) Appl. No.: 12/473,883

(22) Filed: May 28, 2009

(51) Int. Cl.
*H04M 1/00* (2006.01)
*H04B 1/38* (2006.01)

(52) U.S. Cl. ............ 455/569.1; 455/566; 455/570; 455/550.1

(58) Field of Classification Search ............ 455/569.1
See application file for complete search history.

(56) References Cited

U.S. PATENT DOCUMENTS

| | | | |
|---|---|---|---|
| 5,615,256 A | 3/1997 | Yamashita | |
| 2003/0133551 A1* | 7/2003 | Kahn | 379/102.03 |
| 2006/0212289 A1* | 9/2006 | Song et al. | 704/221 |
| 2009/0002147 A1* | 1/2009 | Bloebaum et al. | 340/466 |
| 2009/0312060 A1* | 12/2009 | Bloebaum et al. | 455/566 |

FOREIGN PATENT DOCUMENTS

EP 0 682 437 11/1995

OTHER PUBLICATIONS

Karn, Phil, "The Qualcomm CDMA Digital Cellular System," printed May 28, 2009.

* cited by examiner

*Primary Examiner* — Lester Kincaid
*Assistant Examiner* — Andy Gu

(57) ABSTRACT

Methods and systems are provided for adjusting the volume on a mobile station earpiece based on reverse frame data rate. In an embodiment of the invention, a mobile station transmits a plurality of reverse frames over a specified period of time. For each frame in the plurality of reverse frames, the mobile station measures a reverse frame data rate. The mobile station then uses the measured reverse frame data rates to calculate an average reverse frame data rate for the reverse frames transmitted over the specified period of time. Next, the mobile station adjusts the volume level of an earpiece based at least in part on the average reverse frame data rate.

16 Claims, 4 Drawing Sheets

SYSTEM AND METHOD FOR ADJUSTING THE VOLUME OF AN EARPIECE USING REVERSE FRAME DATA RATE

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet). The gateway is typically coupled with a packet-switched network using a data line such as a T1 cable or a fiber-optic cable.

When a mobile station (such as a cellular telephone, pager, or appropriately-equipped portable computer, for instance) is positioned in a cell, the mobile station communicates via an RF air interface with the BTS antenna of the cell. Consequently, a communication path is established between the mobile station and the transport network, via the air interface, the BTS, the BSC and the switch or gateway.

Overview

In order to transmit voice over a wireless communication system, a mobile station typically converts sound detected from a microphone from analog to digital and encodes the digitized speech. For example, the IS-96 Qualcomm CELP (code excited linear predictive coding) algorithm is a speech-encoding algorithm that is part of the original CDMA (code divisional multiple access) standard. In IS-96, digitized sound data is segmented (along with control information) into 20-ms frames. The data in the frames will be transmitted to the BTS at a certain frame data rate: full rate (9600 bps), half rate (4800 bps), quarter rate (2400 bps), or eighth rate (1200 bps), depending on the amount of sound in the frame (i.e., the louder the sound, the higher the frame data rate). These frames are then transmitted from the mobile station to the BTS, which are forwarded to their intended destination. Frames transmitted from the mobile station to the BTS are known as reverse data frames.

Users often use mobile stations while moving from one environment to another. These environments may have differing levels of ambient noise. For example, a user communicating on a mobile station may move from a quiet office to a noisy street to a somewhat noisy taxi. As a consequence of moving between these environments, users typically change the volume of the mobile station's earpiece based on the level of ambient noise. By way of example, a user may turn up the volume when in a noisy environment, and turn down the volume in a quiet environment.

The present invention provides methods and systems for adjusting the volume on a mobile-station earpiece based on reverse frame data rate. In an embodiment of the invention, a mobile station transmits a plurality of reverse frames over a specified period of time. For each frame in the plurality of reverse frames, the mobile station measures a reverse frame data rate. The mobile station then uses the measured reverse frame data rates to calculate an average reverse frame data rate for the reverse frames transmitted over the specified period of time. Next, the mobile station adjusts the volume level of an earpiece based on the average reverse frame data rate.

These as well as other aspects and advantages will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
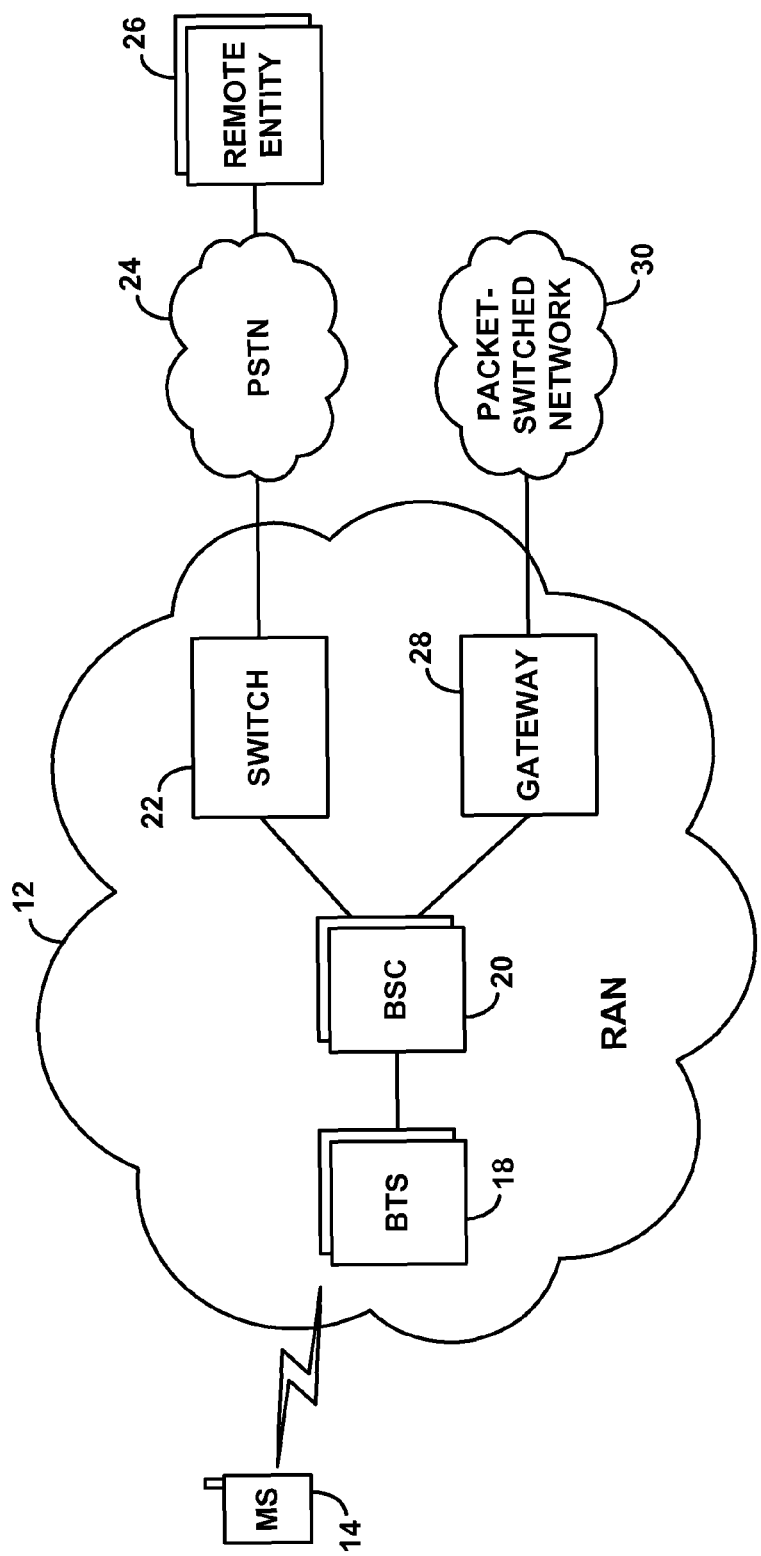
FIG. 1 is a simplified block diagram of a communication system in which an embodiment of the invention can be applied.

Referring to the drawings, FIG. 1 depicts a cellular communication system in which aspects of an embodiment can be applied. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by one or more devices, systems, or other entities, it should be understood that the functions may be implemented by software (e.g., machine-language instructions stored in data storage and executed by a processor), firmware, and/or hardware.

As shown in FIG. 1, the example communication system includes at its core a RAN 12 that is arranged to provide multiple mobile stations with wireless communication service. FIG. 1 depicts a representative mobile station 14, which could be a cell phone, wirelessly-equipped personal data assistant (PDA), or other type of wirelessly-equipped device now known or later developed. Each mobile station is equipped with hardware, software, and/or other logic to communicate with RAN 12 in a known manner in accordance with an agreed communication protocol, such as CDMA (e.g., IS-95, IS-2000, 1xRTT, 1xEV-DO, etc.), iDEN, WiMAX, TDMA, AMPS, GSM, GPRS, UMTS, EDGE, LTE, or any other communication protocol now known or later developed.

The RAN can take various forms and may include any of a variety and number of components, depending for instance on the air-interface protocol employed by the RAN. For example, the RAN may include one or more BTSs 18 and one or more BSCs 20 (also sometimes referred to as radio network controllers (RNCs)). The BTSs preferably include directional antennas, power amplifiers, and associated transceiver equipment arranged to establish various sectors, and to communicate with served mobile stations.

BSC 20 may control one or more BTSs and may manage aspects of air-interface operation. For instance, a BSC may manage assignment of air-interface traffic channels to mobile stations in response to mobile-station origination messages.

Further, the BSC may manage handoff of mobile stations between sectors, by engaging in control-channel signaling.

Each BSC may be coupled with an MSC or other switch 22 that provides connectivity with the PSTN 24 if applicable, so that served mobile stations can communicate with remote entities 26 on the PTSN. And each BSC may also or instead be coupled with a packet data serving node (PDSN) or other gateway 28 that provides connectivity with a packet-switched network 30, so that served mobile stations (and other entities, such as BSC 20) can communicate with other entities on the packet-switched network.

Figure 2:
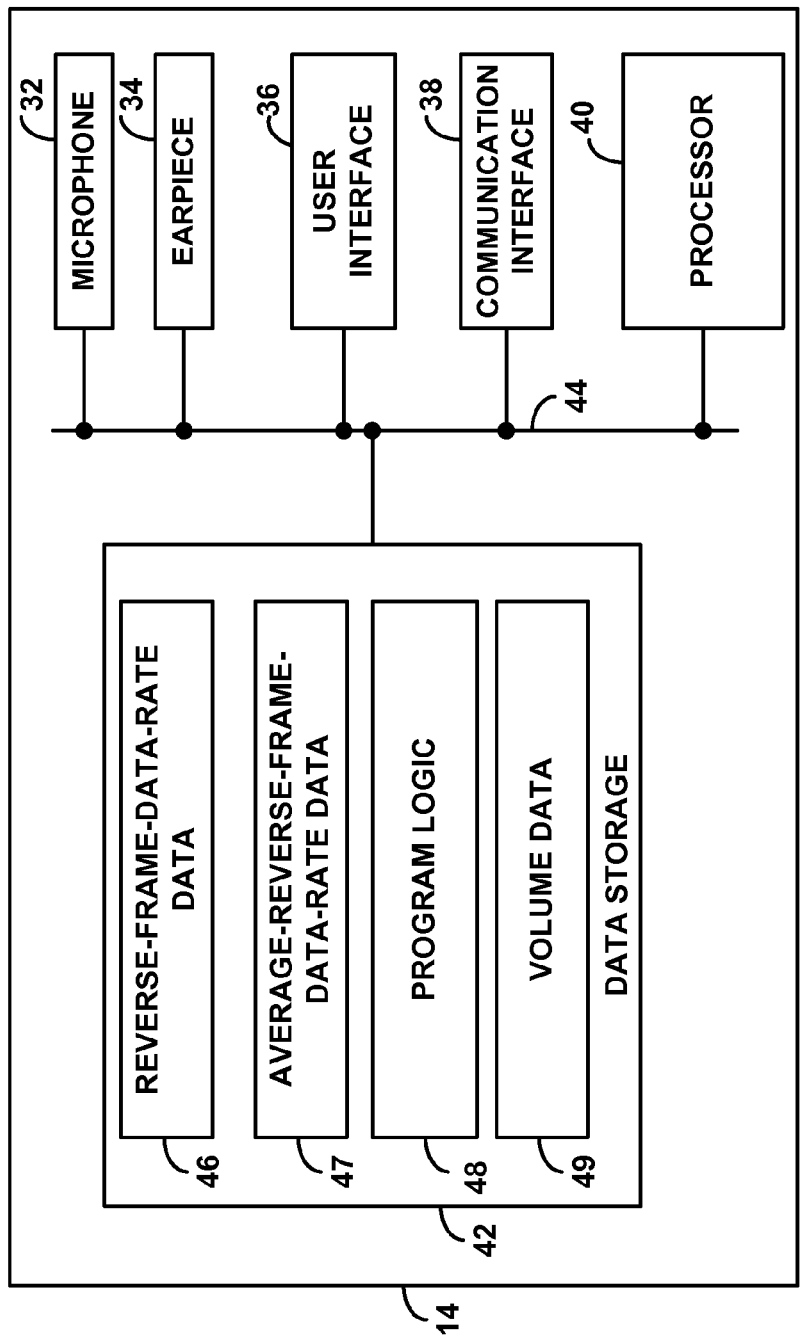
FIG. 2 is a simplified block diagram of a mobile station arranged to implement aspects of an embodiment of the invention.

FIG. 2 is a simplified block diagram depicting functional components of mobile station 14. As shown, mobile station 14 includes by way of example a microphone 32, an earpiece 34, a user interface 36, a communication interface 38, a processor 40, and data storage 42, coupled together by a system bus, network, or other connection mechanism 44.

Microphone 32 may be any device that is capable of receiving analog sound (comprising, for example, a condenser microphone). Earpiece 34 may be any device (comprising, for example, a speaker), capable of playing audio at varying levels of loudness. Either or both of earpiece 34 and microphone 32 may be a physical part of mobile station or may alternatively be separate from mobile station 14, and communicate with mobile station 14 using a wireless technology, such as Bluetooth.

User interface 36 comprises input and output components to facilitate user interaction with mobile station 14. The user interface 36 may include a keypad or other mechanism to facilitate tactile user input. Communication interface 38 may include one or more communication interface mechanisms that enable mobile station 14 to communicate with various other mobile stations and other entities. As such, the communication interface may take various well-known forms, depending on factors such as the type of communication links in use.

Processor 40 may comprise one or more general-purpose processors (e.g., INTEL processors) and/or one or more specialized processors (e.g., digital signal processors and/or application-specific integrated circuits). And data storage 42 may comprise one or more volatile and/or non-volatile storage components, such as optical, magnetic, or organic storage components and may be integrated in whole or in part with processor 40.

As shown, data storage 42 may hold reverse-frame-data-rate data 46, average-reverse-frame-data-rate data 47, program logic 48, and volume settings data 49. The reverse-frame-data-rate data 46 may comprise the reverse frame data rate for each of a plurality of reverse frames transmitted by mobile station 14 over a period of time. The average-reverse-frame-data-rate data 47 may comprise the average reverse frame data rate for a plurality of reverse frames transmitted over a period of time. The program logic 48 may comprise machine-language instructions executable by processor 40 to carry out various functions described herein. The volume data 49 may comprise specific loudness settings for earpiece 34 corresponding to a particular range of average reverse frame data rates. As exemplified in the table below, if the earpiece is equipped with ten different volume levels (with one being the lowest level without muting and ten being the loudest), volume data 49 may comprise the following set of data:

| Average Reverse Frame Data Rate Range | Earpiece Volume Setting |
| --- | --- |
| 1/8-1/4 | 1 |
| 1/4-1/2 | 3 |
| 1/2-3/4 | 7 |
| 3/4-1 | 10 |

It should be understood that other ranges and volume settings may be used as well.

Figure 3:
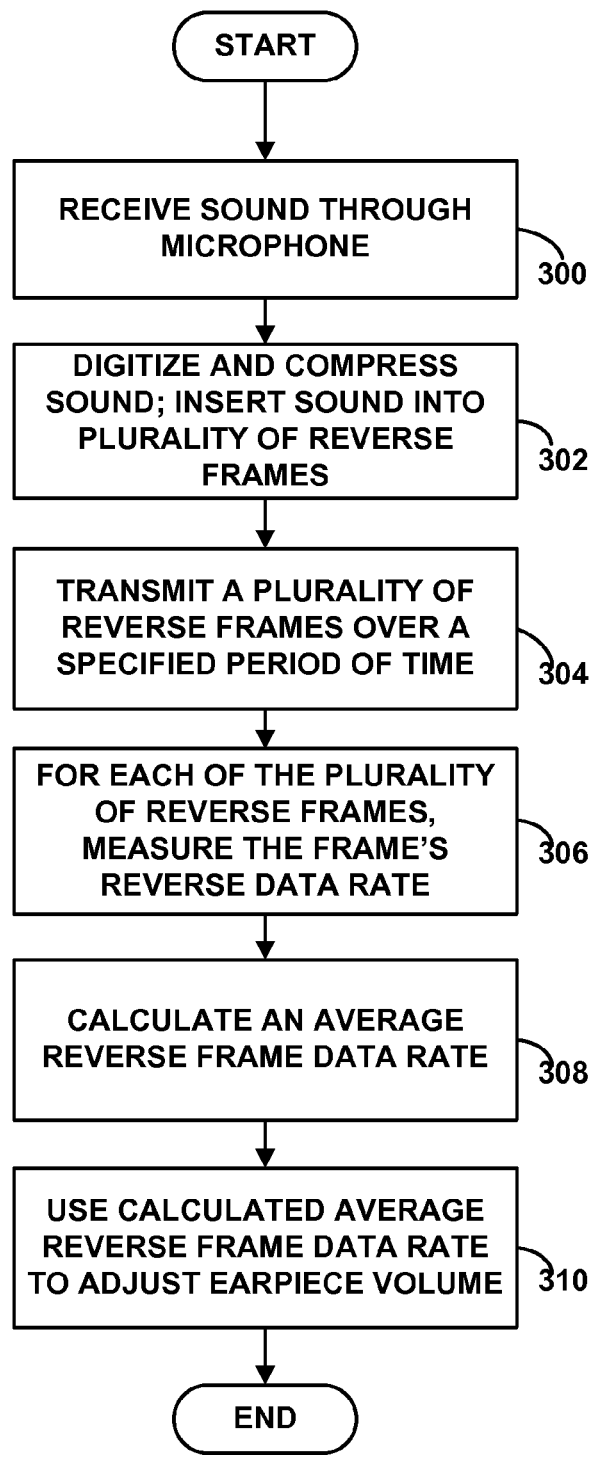
FIG. 3 is a flow chart depicting functions that can be carried out in accordance with an embodiment of the invention.

FIG. 3 is a flow chart depicting a set of functions that can be carried out in accordance with an embodiment of the invention. Generally, FIG. 3 depicts a method of measuring the reverse frame data rate for a plurality of reverse frames transmitted over a specified period of time, calculating an average reverse frame data rate for that period of time, and using the calculated average reverse frame data rate to adjust the volume of an earpiece.

As shown in FIG. 3, at step 300, mobile station 14 receives analog sound through microphone 32. At step 302, mobile station 14 digitizes the analog sound, compresses the sound (using, for example a variable rate voice coder such as CELP) and inserts at least a portion of the digitized sound into a plurality of reverse frames. At step 304, mobile station 14 transmits a plurality of reverse frames over a specified period of time (for example, 2 seconds). It should be understood that other periods of time may be also be specified. At step 306, for each frame in the plurality of reverse frames transmitted over the specified period of time, mobile station 14 measures the frame's reverse frame data rate, and stores that value in reverse-frame-data-rate data 46. At step 308, mobile station 14 calculates an average reverse frame data rate for the specified period of time using the values stored in reverse-frame-data-rate data 46. This average reverse frame data rate is stored in average-reverse-frame-data-rate data 47.

Figure 4:
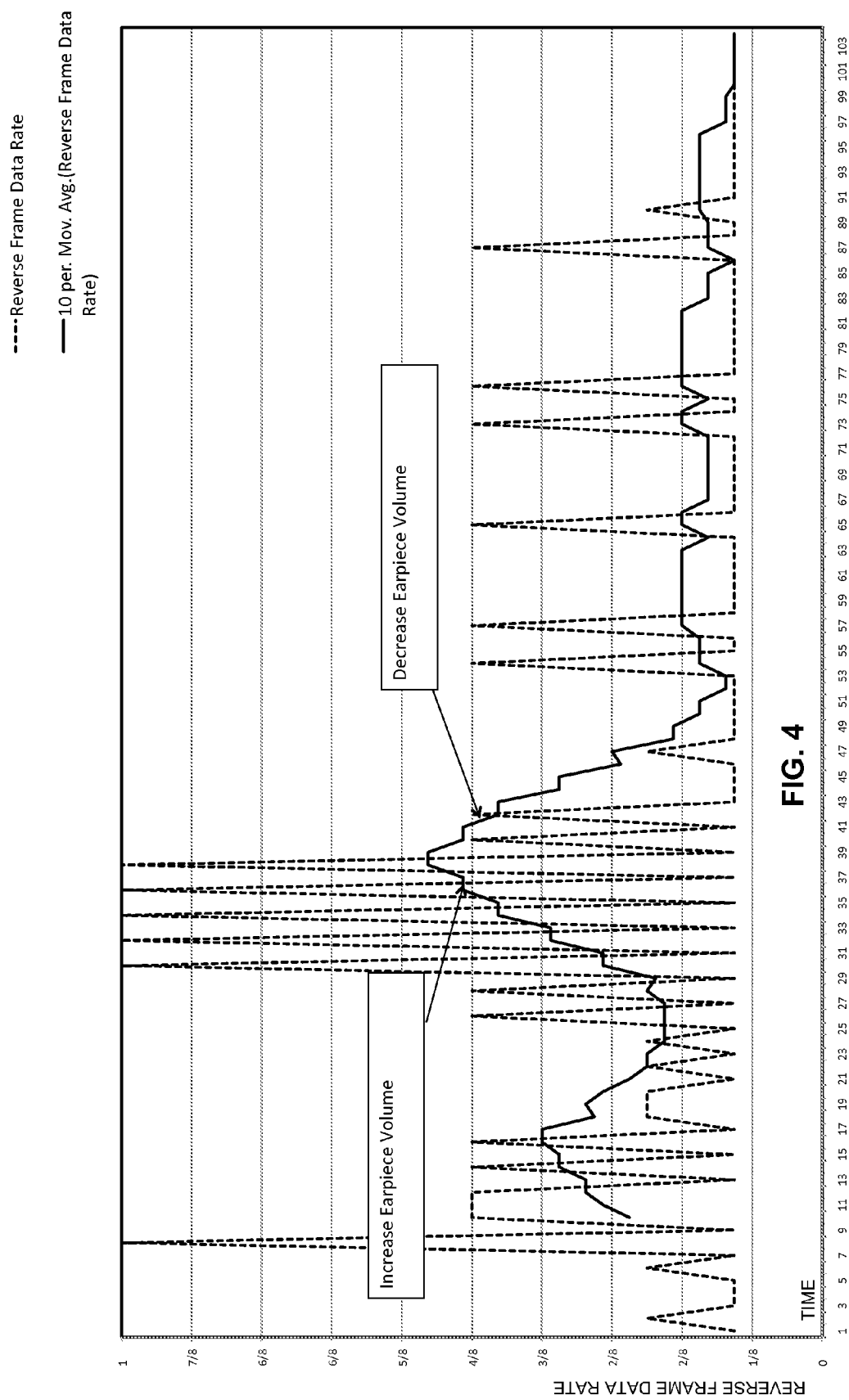
FIG. 4 is a two-dimensional plot depicting reverse frame data rate vs. time.

At step 310, mobile station 14 uses the average reverse frame data rate to determine whether to adjust the volume on earpiece 34. For example, if the average reverse frame data rate for the specified period of time is greater than half (i.e., 4800 bps), it indicates that the mobile station is currently in a somewhat noisy environment. As such, mobile station 14 would raise the volume of the earpiece to a specified level. FIG. 4 is a two-dimensional plot depicting reverse frame data rate (on the y-axis) vs. time (on the x-axis). The dotted line represents the reverse frame data rate for the unit of time. The solid line represents the average reverse frame data rate for the previous 10 units of time. In this example, one unit of time may be 20 milliseconds, although other units of time may be used as well. As shown in FIG. 4, when the average reverse frame data rate rises above half, the volume of the earpiece should be raised to a specified level (for example, the level specified in volume data 49). Similarly, when the average reverse data rate falls below half, the volume of the earpiece should be lowered to a specified level. It should be understood different average data rates and different volume levels may be used as well. For example, if the data frame rate is below one-quarter, the volume may be lowered to yet another specified level.

Returning to step 306, mobile station 14 may additionally first determine the current volume level of the earpiece, and increase the volume of the earpiece when (1) the current volume is below a specified level, and (2) the average reverse frame data rate is above a specified level. Similarly, mobile station 14 may first determine the current volume level of the earpiece, and decrease the volume of the earpiece when (1)

the current volume is above a specified level, and (2) the average reverse frame data rate is below a specified level.

Embodiments of the invention have been described above. Those of ordinary skill in the art will appreciate, however, that modifications may be made while remaining within the scope of the invention as defined by the claims.

The invention claimed is:

1. A method comprising:
    transmitting, by a mobile station involved in a voice communication, a plurality of reverse frames over a specified period of time;
    measuring, by the mobile station, a reverse frame data rate for each frame in the plurality of reverse frames;
    using, by the mobile station, the measured reverse frame data rate for each frame in the plurality of reverse frames to calculate an average reverse frame data rate for the plurality of reverse frames transmitted over the specified period of time;
    if the average reverse frame data rate is greater than 7200 bits per second, adjusting, by the mobile station, a volume level of an earpiece to a maximum level for the voice communication; and
    if the average reverse frame data rate is less than or equal to 7200 bits per second, adjusting, by the mobile station, the volume level of the earpiece to less than the maximum level for the voice communication.

2. The method of claim 1, further comprising:
    receiving, by the mobile station, sound into a microphone;
    digitizing, by the mobile station, the sound; and
    inserting, by the mobile station, at least a portion of the digitized sound into at least one of the plurality of reverse frames.

3. The method of claim 2, further comprising compressing, by the mobile station, the digitized sound.

4. The method of claim 3, wherein compressing the digitized sound comprises using, by the mobile station, a variable rate voice coder.

5. The method of claim 4, wherein the variable rate voice coder uses a coded excited linear prediction algorithm.

6. The method of claim 1, wherein the earpiece is a Bluetooth earpiece.

7. The method of claim 1, further comprising:
    adjusting, by the mobile station, the volume level of the earpiece to a minimum non-mute level if the average reverse frame data rate is less than or equal to 2400 bits per second.

8. The method of claim 1, wherein the average reverse frame data rate takes on a value between 0 and 9600 bits per second, inclusive.

9. A mobile-station system comprising:
    an earpiece;
    a communication interface;
    a processing unit;
    data storage; and
    program logic stored in the data storage and executable by the processing unit to:
        during a voice communication, transmit over a specified period of time a plurality of reverse frames;
        for each frame in the plurality of reverse frames, measure a reverse frame data rate;
        use the measured reverse frame data rate for each frame in the plurality of reverse frames to calculate an average reverse frame data rate for the plurality of reverse frames transmitted over the specified period of time;
        if the average reverse frame data rate is greater than 7200 bits per second, adjust a volume level of an earpiece to a maximum level for the voice communication; and
        if the average reverse frame data rate is less than or equal to 7200 bits per second, adjust the volume level of the earpiece to less than the maximum level for the voice communication.

10. The mobile-station system of claim 9, wherein the program logic is further executable by the processing unit to:
    digitize sound received from a microphone; and
    insert at least a portion of the digitized sound into at least one of the plurality of reverse frames.

11. The mobile-station system of claim 10, wherein the program logic is further executable by the processing unit to compress the digitized sound.

12. The mobile-station system of claim 11 wherein the program logic is further executable by the processing unit to compress the digitized sound using a variable rate voice coder.

13. The mobile-station system of claim 12, wherein the variable rate voice coder is arranged to use a coded excited linear prediction algorithm.

14. The mobile-station system of claim 9, wherein the earpiece is a Bluetooth earpiece.

15. The mobile-station system of claim 9, wherein the program logic is further executable by the processing unit to adjust the volume level of the earpiece to a minimum non-mute level if the average reverse frame data rate is less than or equal to 2400 bits per second.

16. The mobile-station system of claim 9, wherein the average reverse frame data rate takes on a value between 0 and 9600 bits per second, inclusive.

* * * * *